United States Patent [19]

Perry

[11] Patent Number: 5,537,299
[45] Date of Patent: Jul. 16, 1996

[54] MULTIPLE LIGHT SYSTEM FOR WATERCRAFT AND THE LIKE

[75] Inventor: Harold D. Perry, Wichita, Kans.

[73] Assignee: Peter Anton, Wichita, Kans.

[21] Appl. No.: 402,815

[22] Filed: Mar. 13, 1995

[51] Int. Cl.⁶ .................................................. B60Q 1/00
[52] U.S. Cl. ............................ 362/61; 362/20; 362/242; 362/250; 362/251; 362/430; 362/431
[58] Field of Search .............................. 362/61, 236, 242, 362/250, 251, 396, 430, 431, 20, 207

[56] References Cited

U.S. PATENT DOCUMENTS

| 901,284 | 10/1908 | Edmunds | 362/431 |
|---|---|---|---|
| 2,638,297 | 5/1953 | Weinberger | 362/396 |
| 3,431,408 | 3/1969 | Roosevelt | 362/61 |
| 3,833,800 | 9/1974 | Stewart et al. | 362/61 |
| 4,856,452 | 8/1989 | Pingel et al. | 362/61 |
| 4,884,173 | 11/1989 | Cassidy | 362/61 |
| 5,142,457 | 8/1992 | Wehner | 362/61 |
| 5,335,149 | 8/1994 | Evans | 362/61 |
| 5,339,225 | 8/1994 | Wiggerman | 362/61 |

Primary Examiner—Denise L. Gromada
Assistant Examiner—Alfred Basichas
Attorney, Agent, or Firm—Litman, McMahon and Brown

[57] ABSTRACT

A multiple light system is provided for watercraft and the like which combines navigation light and docking light capabilities. A navigation light is mounted on top of a mast which protrudes from the watercraft deck. An auxiliary light, which can comprise a docking light, is mounted on the mast by a mounting assembly. The auxiliary light draws electrical power from a bulb of the navigation light and can be independently disabled by means of a switch on the mounting bracket.

9 Claims, 1 Drawing Sheet

MULTIPLE LIGHT SYSTEM FOR WATERCRAFT AND THE LIKE

BACKGROUND OF THE INVENTION

1. Field of the Invention

The present invention relates generally to vehicle lights, and in particular to a multiple light system for watercraft.

2. Description of the Related Art

Light systems are well-known and various types have heretofore been devised for meeting the requirements of particular lighting applications. For example, vehicles of various types typically have lighting systems for specialized purposes associated with their operation. Such purposes can include collision avoidance, for which many vehicles carry running lights of various configurations so that they are clearly visible to other vehicles.

Such light systems may be required for vehicle operation. For example, maritime regulations, such as those promulgated by the U.S. Coast Guard, specify the location, size, output and color of watercraft running lights. Such regulations tend to provide a degree of uniformity in watercraft lighting whereby watercraft operators can more quickly recognize other watercraft at night and take appropriate measures to avoid colliding with them. Hence, by regulation watercraft operated at night are required to display a bow light with a red light on the port (left) side and a green light on the starboard (right) side so that observance of such a light from other watercraft provides an indication of the direction of travel.

Other types of watercraft lighting systems serve different purposes, e.g., to illuminate areas external to the watercraft. Heretofore, relatively high output lights have been provided on the bows of boats to function in a manner similar to headlights on a road vehicle. However, Coast Guard regulations restrict the use of such lights to avoid impairing the vision of other watercraft operators.

Search lights and floodlights have also been mounted on watercraft, but typically they are intended for more general purposes as opposed to illuminating the area directly ahead of a boat. Lighting can become important in docking a boat and in launching and retrieving a boat with a trailer at a loading ramp. In the case of recreational watercraft which are often trailered to and from the boat loading ramps at public marinas, retrieval operations onto trailers after dark are fairly common. However, problems can arise with docking and trailer-loading operations due to the inadequacies of most navigation lights in providing sufficient illumination. Such operations could often be accomplished more safely and efficiently with adequate bow lighting, provided such lighting could be activated independently of the bow navigational or running lights in order to comply with Coast Guard regulations and to avoid obscuring the visibility of the bow navigational light.

The bow areas of many boats can be limited in space for mounting additional equipment, such as lighting systems. For example, recreational watercraft often have trolling motors, individual seats for fishing, etc. mounted in the bow areas thereof. Moreover, such equipment may have to be removed in order to place a cover over a boat for protecting it during periods of non-use. For this reason the red/green bow navigational lights of many watercraft are often mounted on removable masts or standards to facilitate covering and storing the boats during periods of non-use.

Therefore, an effective watercraft docking light should not interfere with the boat navigation lights, should be out of the way of other equipment and should provide effective illumination of an area in front of the boat. The present invention address the aforementioned problems related to watercraft lighting systems. Heretofore there has not been available a multiple lighting system for watercraft with the advantages and features of the present invention.

SUMMARY OF THE INVENTION

In the practice of the present invention, a multiple light system is provided for mounting on the bow of a watercraft. The multiple light system includes a navigational light assembly with a mast or standard mounting a navigational light. An auxiliary light is mounted on the mast by a light mounting assembly which includes an extension bracket. The auxiliary light is electrically coupled to the mast-mounted navigation light and a switch is provided on the extension bracket for selectively disabling the auxiliary light.

OBJECTS AND ADVANTAGES OF THE INVENTION

The principles objects and advantages of the present invention include: providing a multiple light system; providing such a light system for watercraft; providing such a light system with a docking light adapted for mounting on an existing mast-mounted navigation light assembly; providing such a light system with an auxiliary light assembly which is adapted to be easily retrofit on an existing light assembly; providing such a light system wherein the auxiliary light is electrically connected to an existing light assembly; providing such a light system which facilitates docking operations; providing such a light system which facilitates-loading and unloading a watercraft with a trailer; providing such a light system which can be selectively disabled independently of the navigational light; providing such a light system wherein the auxiliary light can be positioned out of the way of other equipment; and providing such a light system which is economical to manufacture, efficient in operation and particularly well-adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE PREFERRED EMBODIMENTS

I. Introduction and Environment

Figure 1:
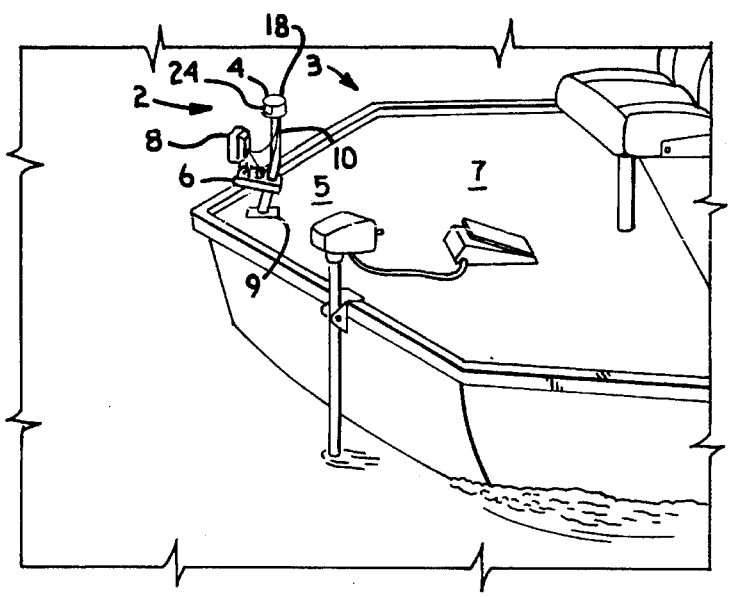
FIG. 1 is an upper, side perspective view of a multiple light system embodying the present invention, shown mounted on the bow of a boat.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, the reference numeral 2 generally designates a multiple light system embodying the present invention. The multiple light system 2 generally comprises a mast-mounted light assembly 4, a light mounting assembly 6 and an auxiliary or additional light 8.

The multiple light system 2 is shown mounted on a boat 3 near the bow 5 thereof, which can include a deck 7 with a light mast mounting plate 9, through which the multiple light system 2 can be inserted for connection to an electrical system of the boat 3.

II. Mast-Mounted Light Assembly 4

The mast-mounted light assembly 4 includes a tubular mast or standard 10 with a lower end 12 which can include an end plug 14 for connection to an electrical system of the boat 3 and an upper end 16 mounting a mast-mounted navigation light 18. The mast or standard 10 includes a slight bend at 20, but could also have a straight configuration.

The mast-mounted light 18 includes a housing 22 mounted on the mast or standard upper end 16 and mounting a lens 24 for directionally emitting light from a socket-type bulb 26 with electrical contacts 28a, 28b. The bulb 26 can be either a replacement for or a modification of a conventional socket-type bulb which is normally utilized in navigation lights such as that shown at 18. The mast-mounted light 18 can comprise a navigation or running light with the lens 24 being divided into a green (starboard) portion and a red (port) portion consistent with conventional maritime practice.

III. Light Mounting Assembly 6

The light mounting assembly 6 includes an extension bracket 30 with a generally rectilinear configuration having proximate and distal ends 32, 34, upper and lower surfaces 36a, 36b and opposite side edges 38.

A mast receiver 40 extends between the extension bracket surfaces 36a, 36b and is open at a slot 42 which extends from the mast receiver 40 to the bracket proximate end 32. A clamp bolt receiver 44 extends transversely through the extension bracket 30 between its side edges 38 and through the slot 42 intermediate the mast receiver 40 and the bracket proximate end 32. The receiver 44 receives a clamp bolt 46 which threadably mounts a clamp nut 48 for providing clamp means whereby the extension bracket 30 is slidably and rotatably mounted on the mast 10.

A switch receiver 50 extends through the extension bracket 30 intermediate the mast receiver 40 and the distal 34 end thereof. The switch receiver 50 includes a counterbore 52 open at the extension bracket lower surface 36b. A bolt receiver 54 is provided in proximity to the extension bracket 30 distal end 34 and extends between the bracket upper and lower surfaces 36a, 36b.

Figure 4:
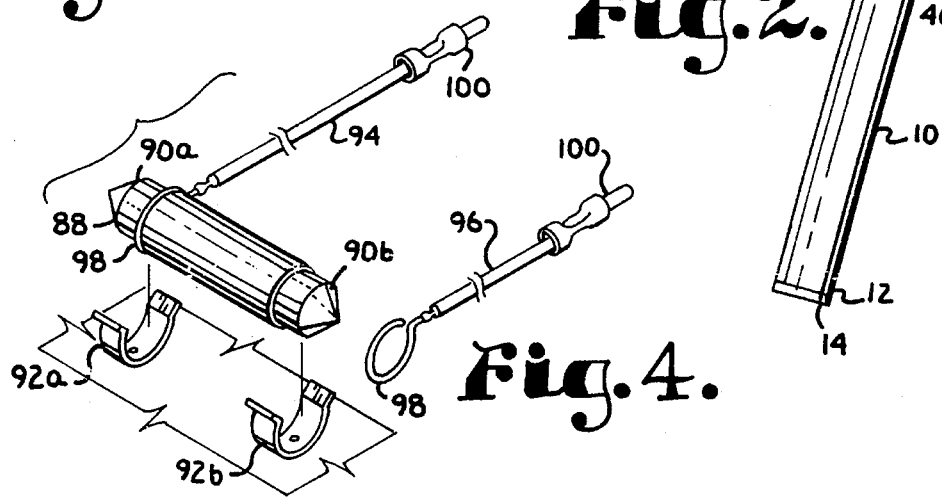
FIG. 4 is an enlarged, fragmentary side elevational view thereof, particularly showing the connections of electrical leads to contacts of a light bulb.

First and second electrical leads 56, 58 are electrically connected to the bulb electrical contacts 28a, 28b respectively (FIG. 4) and are provided with respective push-type electrical connectors 60 for disengagement of the electrical leads 56, 58 whereby the entire light mounting assembly 6 and the auxiliary light 8 can be separated from the mast 10.

A single pole, single throw (SPST) toggle switch 62 is provided in series with the second electrical lead 58 and includes a toggle extension 64 with male threads for receiving a toggle switch mounting nut 66 with the toggle extension 64 extending through the switch receiver 50 and the toggle switch mounting nut 66 received in the counterbore 52.

IV. Auxiliary Light 8

The auxiliary light 8 can be used as a docking light and for this purpose can comprise a halogen quartz bulb 72 mounted in a housing 74 and electrically connected to the leads 56, 58, the latter via the toggle switch 62. The auxiliary light 8 has a clevis 76 with a mounting bolt 78 descending downwardly therefrom and rotatably received in the bolt receiver 54. The bolt 78 mounts a washer 80 and threadably mounts a mounting nut 82. The housing 74 is mounted on the clevis 76 by an axle bolt 84 and an axle nut 86 which permit adjustment of the orientation of the auxiliary light 8 by rotation with respect to a horizontal axis extending coaxially through the axle bolt 84.

V. Installation and Operation

The bracket 30 can be installed on an existing mast-mounted light assembly. Alternatively, the entire light system 2 can comprise a single unit.

For purposes of retrofitting to an existing bow light, the mast-mounted light assembly 4 can be removed by extracting the mast 10 from the plate or socket 9. The extension bracket 30 can then be slid over the mast 10 for clamping thereto by means of the clamp bolt and nut 46, 48. The extension bracket 30 permits rotation on the mast 10 for providing illumination where needed, e.g., directly ahead, off to a side, back into the vessel, etc. Moreover, the light mounting assembly 6 can be vertically adjusted on the mast 10.

The mast-mounted housing 22 can be modified by drilling a hole 75 in a lower portion thereof for the leads 56, 58.

VI. Modified Electrical Leads for Connection to an Alternative Bulb

Figure 5:
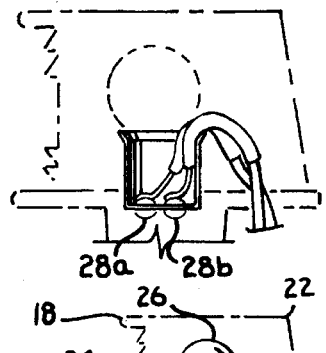
FIG. 5 is a fragmentary, exploded perspective view of an electrical connection system for an alternative type of navigational light bulb.
Figure 3:
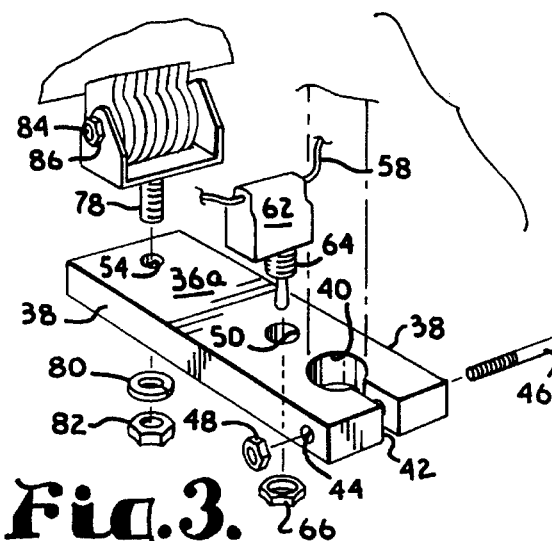
FIG. 3 is a fragmentary, exploded, perspective view of the light system, particularly showing a light mounting assembly for mounting an auxiliary light.
Figure 2:
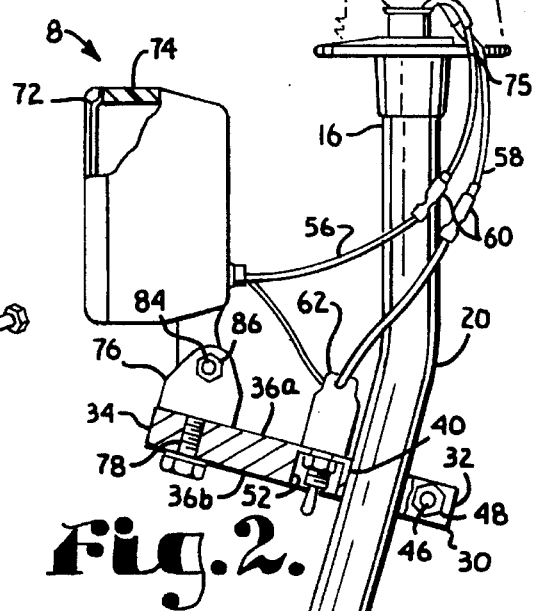
FIG. 2 is a side elevational view thereof, particularly showing the electrical interconnection of a navigation light assembly and an auxiliary light.

FIG. 5 shows an alternative bulb 88 with electrical contacts 90a, 90b on the ends thereof for conductive receipt in electrical conductors 92a, 92b respectively of an alternative embodiment, mast-mounted navigational light assembly. For connecting the auxiliary light 8 to the alternative bulb 88, first and second electrical leads 94, 96 are provided with end loops 98 which slide over the bulb contacts 90a, 90b for making electrical contact therewith. The leads 94, 96 terminate at electrical connectors 100 for connection to electrical connectors 60 as described above.

It will be appreciated that various other types of electrical connection and retrofit arrangements could be provided for adapting the multiple light system 2 of the present invention to a variety of existing navigation lights, or for providing an integral multiple light system with both navigation and docking light capabilities.

It is to be understood that while certain forms of the present invention have been illustrated and described herein, it is not to be limited to the specific forms or arrangement of parts described and shown.

What is claimed and desired to be secured by Letters Patent is as follows:

1. A multiple light system for a watercraft and the like, which includes:
   (a) a mast having a lower end for connection to a watercraft or the like and an upper end;
   (b) an upper light mounted on said mast upper end and including a housing and an electrical bulb with electrical contacts in said housing;
   (c) an extension bracket mounted on said mast intermediate the upper and lower ends thereof, said extension bracket having a proximate end and a distal end;
   (d) extension bracket clamping means associated with said extension bracket proximate end for clamping same on said mast;
   (e) an auxiliary light including an auxiliary housing and an auxiliary electrical bulb with electrical contacts in said auxiliary housing;
   (f) auxiliary light mounting means mounting said auxiliary light on said extension bracket distal end;
   (g) said extension bracket further having upper and lower surfaces opposite side edges;
   (h) said extension bracket clamping means including a mast receiver extending between said extension bracket surfaces in proximity to said extension bracket end and a slot open at and extending between said extension bracket proximate end and said mast receiver and a clamp bolt receiver extending through said extension bracket between the side edges thereof and through said slot between said extension bracket proximate end and said mast receiver and a clamp bolt received in said clamp bolt receiver and threadably receiving a clamp nut for tightening said extension bracket proximate end on said mast;
   (i) said auxiliary light mounting means further including a clevis bolt receiver extending between said extension bracket upper and lower surfaces and located in proximity to said extension bracket distal end; and
   (j) said auxiliary light mounting means further including a clevis mounting bolt rotatably received in said clevis bolt receiver and threadably receiving a mounting nut.

2. The light mounting assembly of claim 1, which includes:
   (a) electrical connection means for electrically connecting said mast-mounted light to said auxiliary light.

3. The light mounting assembly according to claim 2, which includes:
   (a) a first electrical lead electrically connected to said mast-mounted light and to said auxiliary light;
   (b) a second electrical lead electrically connected to said mast-mounted light and to said auxiliary light; and
   (c) electrical switch means interposed in said second electrical lead.

4. The light mounting assembly according to claim 3 wherein:
   (a) said switch comprises a toggle switch with a male-threaded toggle extension; and
   (b) a switch receiver in said extension bracket intermediate the proximate and distal ends thereof, said switch receiver receiving said toggle extension.

5. The light mounting assembly according to claim 4, which includes:
   (a) said switch receiver being countersunk; and
   (b) a nut threadably received on said toggle extension within said countersunk portion of said switch receiver with said switch mounted on said extension bracket between the proximate and distal ends thereof.

6. The light mounting assembly according to claim 3 wherein said electrical connection means includes a replacement bulb for said mast-mounted light, said replacement bulb having electrical contacts and said electrical leads being electrically connected to said contacts.

7. The light mounting assembly according to claim 3, which includes:
   (a) each said electrical lead terminating at a loop; and
   (b) said mast-mounted light having a bulb with a pair of end contacts each receiving a respective lead loop.

8. The light mounting assembly according to claim 3, which includes:
   (a) said mast-mounting light including a housing mounted on said mast;
   (b) an opening in said mast-mounted light housing; and
   (c) said electrical leads extending through said housing opening.

9. In combination with a watercraft navigation light assembly including a mast with upper and lower ends, the mast lower end being mounted on the front deck of a watercraft, a navigation light mounted on the mast upper end and having a navigation light mounted on the mast upper end and having a navigation light housing with an opening, a navigation light bulb with electrical contacts mounted within the housing, and a lens mounted in the housing, the watercraft having an electrical system electrically connected to said navigation light bulb; the improvement which comprises:
   (a) an auxiliary light mounting assembly including:
      (1) an extension bracket with proximate and distal ends, upper and lower surfaces, opposite side edges, said extension bracket having a substantially uniform thickness;
      (2) a mast receiver extending between said extension bracket surfaces in proximity to said extension bracket proximate ends said mast receiver having a length corresponding to the thickness of the extension bracket and the spacing of its upper and lower surfaces sufficient to provide a relatively stable mounting of said extension bracket on said mast with contact therebetween within said mast receiver;
      (3) a slot open at and extending between said extension bracket proximate end and said mast receiver;
      (4) a clamp bolt receiver extending through said extension bracket between the side edges thereof and through said slot between said extension bracket proximate end and said mast receiver;
      (5) a clamp bolt received in said clamp bolt receiver and threadably receiving a clamp nut for tightening said extension bracket proximate end on said mast;
      (6) a switch receiver extending between and open at said extension bracket upper and lower surfaces, said switch receiver including a counterbore open at said extension bracket lower surface and being located between said extension bracket proximate distal ends; and
      (7) a clevis bore receiver extending between said extension bracket upper and lower surfaces and located in proximity to said extension bracket distal end;
   (b) first and second electrical leads electrically connected to said navigation light bulb contacts and extending through said navigation light housing opening;

(c) each said electrical lead including an electrical connector for selectively connecting and separating same;

(d) a switch electrically connected in series to one of aid electrical leads, said switch including an extension extending through said switch receiver and threadably mounting a switch mounting nut received in said counterbore; and (e) an auxiliary light including:
 (1) an auxiliary light housing;
 (2) an auxiliary light bulb mounted in the auxiliary light housing;
 (3) the auxiliary light housing having an auxiliary light housing opening with said electrical leads passing therethrough;
 (4) a clevis pivotally connected to said auxiliary light housing and adapted for rotation with respect thereto about a horizontal axis, said clevis including a clevis mounting bolt extending through said extension bracket bolt receiver and threadably receiving a mounting nut;
 (5) an axle bore rotatably interconnecting said clevis and said auxiliary light housing; and
 (6) an axle nut threadably mounted on said axle bolt.

* * * * *